US012444363B2

(12) United States Patent
Yao et al.

(10) Patent No.: US 12,444,363 B2
(45) Date of Patent: Oct. 14, 2025

(54) PIXEL CIRCUIT AND DISPLAY MODULE

(71) Applicants: Hefei Visionox Technology Co., Ltd., Anhui (CN); KunShan Go-Visionox Opto Electronics Co., Ltd, Jiangsu (CN)

(72) Inventors: Yuan Yao, Hefei (CN); Chung-Chun Lee, Hefei (CN); Yiming Xiao, Hefei (CN); Qing Bai, Hefei (CN); Liusong Ni, Hefei (CN); Mingchen Li, Hefei (CN)

(73) Assignees: Hefei Visionox Technology Co., Ltd., Hefei (CN); Kunshan Go-Visionox Opto Electronics Co., Ltd, Kunshan (CN)

( * ) Notice: Subject to any disclaimer, the term of this patent is extended or adjusted under 35 U.S.C. 154(b) by 0 days.

(21) Appl. No.: 18/660,506

(22) Filed: May 10, 2024

(65) Prior Publication Data

US 2025/0124865 A1 Apr. 17, 2025

(30) Foreign Application Priority Data

Oct. 12, 2023 (CN) ......................... 202311324257.8

(51) Int. Cl.
*G09G 3/3233* (2016.01)

(52) U.S. Cl.
CPC ..... *G09G 3/3233* (2013.01); *G09G 2300/043* (2013.01); *G09G 2300/0842* (2013.01);
(Continued)

(58) Field of Classification Search
CPC ........... G09G 3/3233; G09G 2300/043; G09G 2300/0842; G09G 2310/061;
(Continued)

(56) References Cited

U.S. PATENT DOCUMENTS

| | | | | |
|---|---|---|---|---|
| 2002/0113760 A1* | 8/2002 | Kimura | G09G 3/3233 | 345/82 |
| 2014/0062987 A1* | 3/2014 | Pietro | G09G 3/12 | 345/212 |

(Continued)

FOREIGN PATENT DOCUMENTS

| | | |
|---|---|---|
| CN | 101996580 A | 3/2011 |
| CN | 103247256 A | 8/2013 |

(Continued)

OTHER PUBLICATIONS

English Translation of CN111462680, cited in IDS dated May 10, 2024.*

(Continued)

*Primary Examiner* — Hong Zhou
(74) *Attorney, Agent, or Firm* — Maier & Maier, PLLC

(57) ABSTRACT

A pixel circuit and a display module, and relate to the field of display panels. The pixel circuit includes: a driving module electrically connected to a first electrode of a light-emitting element and configured to drive the light-emitting element to emit light; and a shunt branch. A first terminal of the shunt branch is electrically connected to the first electrode of the light-emitting element, a second terminal of the shunt branch is electrically connected to a first reference voltage signal line, and the shunt branch is configured to transmit part of a driving current provided by the driving module to the first reference voltage signal line.

18 Claims, 7 Drawing Sheets

(52) U.S. Cl.
CPC ... *G09G 2310/061* (2013.01); *G09G 2310/08* (2013.01); *G09G 2320/0233* (2013.01); *G09G 2320/0626* (2013.01); *G09G 2330/021* (2013.01)

(58) Field of Classification Search
CPC ....... G09G 2310/08; G09G 2320/0233; G09G 2320/0626; G09G 2330/021
See application file for complete search history.

(56) References Cited

U.S. PATENT DOCUMENTS

| | | | | |
|---|---|---|---|---|
| 2015/0145850 | A1* | 5/2015 | Rohatgi | G09G 3/006 345/212 |
| 2017/0186375 | A1* | 6/2017 | Jung | G09G 3/3233 |
| 2019/0287459 | A1* | 9/2019 | Liu | G09G 3/3233 |
| 2021/0210020 | A1* | 7/2021 | Cho | G09G 3/3266 |
| 2021/0312859 | A1* | 10/2021 | Yang | G09G 3/32 |
| 2022/0172664 | A1* | 6/2022 | Park | G09G 3/2074 |
| 2022/0198999 | A1* | 6/2022 | Tseng | G09G 3/3233 |
| 2024/0331618 | A1* | 10/2024 | Son | G09G 3/3233 |
| 2024/0395199 | A1* | 11/2024 | Li | G09G 3/3208 |

FOREIGN PATENT DOCUMENTS

| | | | |
|---|---|---|---|
| CN | 106409233 | A | 2/2017 |
| CN | 106997747 | A | 8/2017 |
| CN | 107845362 | A | 3/2018 |
| CN | 111462680 | A | 7/2020 |
| CN | 114143927 | A | 3/2022 |
| CN | 115424585 | A | 12/2022 |
| CN | 115482779 | A | 12/2022 |
| CN | 116075194 | A | 5/2023 |
| KR | 1020150083371 | A | 7/2015 |
| KR | 1020230022359 | A | 2/2023 |

OTHER PUBLICATIONS

Office Action issued on Jan. 14, 2025, in corresponding Korean Application No. 10-2024-0115639, 7 pages, with partial English translation.

Office Action issued on Aug. 15, 2025, in corresponding Chinese Application No. 202311324257.8, 15 pages.

* cited by examiner

PIXEL CIRCUIT AND DISPLAY MODULE

CROSS REFERENCE TO RELATED APPLICATION

The application claims the priority to Chinese Patent Application No. 202311324257.8, filed on Oct. 12, 2023 and entitled "PIXEL CIRCUIT AND DISPLAY MODULE", which is incorporated herein by reference in its entirety.

TECHNICAL FIELD

The present application belongs to the technical field of display panels, and in particular, to a pixel circuit and a display module.

BACKGROUND

Flat panel display devices based on technologies such as Organic Light Emitting Diode (OLED) and Light Emitting Diode (LED) have advantages of high quality, power saving, thin body and wide application range, and are widely used in mobile phones, TVs, laptops, desktop computers and other consumer electronic products, which thus become the mainstream of the display devices. However, it is necessary to improve usage performance of the current OLED display products.

SUMMARY

Embodiments of the present application provide a pixel circuit and a display module, which can fully alleviate the problem of uneven display brightness of the display panel, thereby effectively improving a display effect and usage performance of the display panel.

In a first aspect, an embodiment of the present application provides a pixel circuit, the pixel circuit including:

- a driving module electrically connected to a first electrode of a light-emitting element and configured to drive the light-emitting element to emit light; and
- a shunt branch, wherein a first terminal of the shunt branch is electrically connected to the first electrode of the light-emitting element, a second terminal of the shunt branch is electrically connected to a first reference voltage signal line, and the shunt branch is configured to transmit part of a driving current provided by the driving module to the first reference voltage signal line.

In a second aspect, an embodiment of the present application provides a display module including a display panel, the display panel including the pixel circuit as provided in any one of the foregoing implementations in the first aspect of the present application.

As can be seen from the above description, the embodiments of the present application provide a pixel circuit and a display module. The pixel circuit includes a driving module and a shunt branch. The driving module is electrically connected to a first electrode of a light-emitting element, and may be configured to drive the light-emitting element to emit light. The shunt branch has a first terminal electrically connected to the first electrode of the light-emitting element and a second terminal electrically connected to a first reference voltage signal line, and may be configured to transmit part of a driving current provided by the driving module to the first reference voltage signal line. Compared with the prior art, in the pixel circuit and the display module provided in the embodiments of the present application, the driving current provided by the driving module is shunted through the shunt branch, which helps to make the current flowing through the driving module larger, equivalent to indirectly increasing a total current flowing through the driving module through shunting, thereby increasing "grayscale brightness" of the pixel circuit in a disguised manner. In this way, after the grayscale brightness is increased due to shunting, characteristic fluctuations of electronic devices inside the pixel circuit have a relatively small impact on the current, so that brightness of the light-emitting element driven by the pixel circuit reaches expected brightness, thereby improving brightness uniformity under low grayscale and low brightness and improving image quality, and then helping to alleviate the problem of uneven display on the display panel.

BRIEF DESCRIPTION OF THE DRAWINGS

In order to more clearly illustrate the technical solutions in embodiments of the present application, the accompanying drawings to be used in the description of the embodiments of the present application will be briefly introduced below. For those of ordinary skill in the art, other accompanying drawings can also be obtained from the provided drawings without creative efforts.

DETAILED DESCRIPTION

Figure 1:
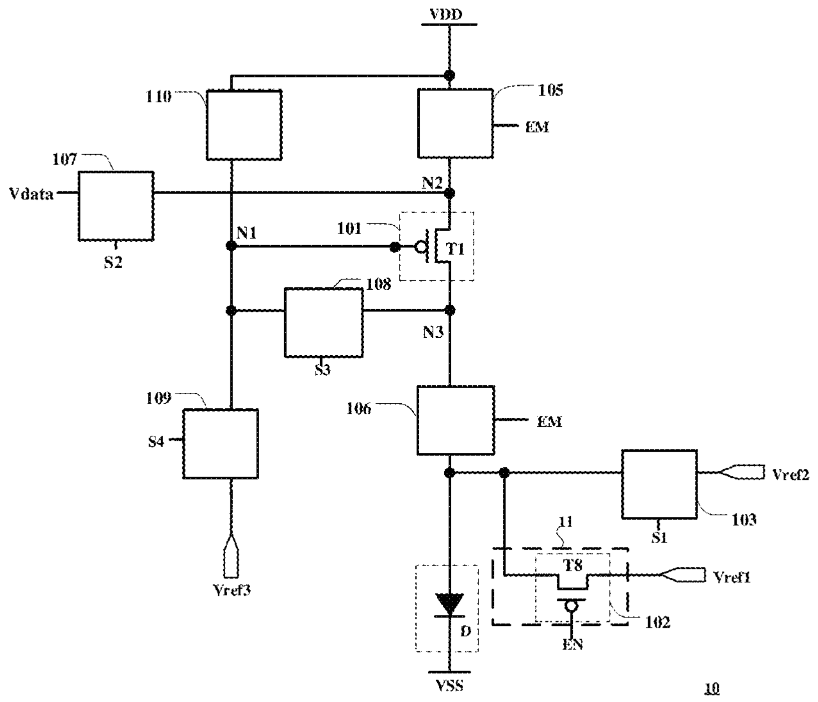
FIG. 1 is a schematic structural diagram of a pixel circuit according to an embodiment of the present application.

Features and exemplary embodiments in various aspects of the present application will be described in detail below.

To make the objectives, technical solutions, and advantages of the present application clearer, the present application will be further described in detail below with reference to the accompanying drawings and specific embodiments. It should be understood that the specific embodiments described herein are merely configured to explain the present application, rather than to limit the present application. For those skilled in the art, the present application can be implemented without some of these specific details. The following description of the embodiments is merely to provide a better understanding of the present application by illustrating the examples of the present application.

It is to be noted that the relationship terms used herein, such as first and second, are only used to distinguish one entity or operation from another entity or operation, but do not necessarily require or imply that there is such an actual relationship or order between these entities or operations. Moreover, the terms “include,” “comprise,” or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording “comprise(s)/include(s) a/an . . . ” do not exclude additional identical elements in the processes, methods, articles, or devices including the listed elements.

It should be understood that the term “and/or” used herein is merely an association relationship describing associated objects, indicating that three relationships may exist. For example, A and/or B indicates that there are three cases of A alone, A and B together, and B alone. In addition, the character “/” herein generally means that associated objects before and after it are in an “or” relationship.

It is to be noted that a transistor in the embodiments of the present application may be an N-type transistor or a P-type transistor. For the N-type transistor, an on level is a high level and an off level is a low level. That is, when a gate of the N-type transistor is at a high level, a connection between a first electrode and a second electrode thereof is turned on, and when the gate of the N-type transistor is at a low level, the connection between the first electrode and the second electrode thereof is turned off. For the P-type transistor, the on level is a low level and the off level is a high level. That is, when a control electrode of the P-type transistor is at a low level, a connection between a first electrode and a second electrode thereof is turned on, and when the control electrode of the P-type transistor is at a high level, the connection between the first electrode and the second electrode thereof is turned off. During specific implementation, the gate of each of the above transistors is taken as a control electrode thereof. Moreover, according to a signal of the gate of the transistor and a type thereof, the first electrode thereof may be taken as a source and the second electrode may be taken as a drain, or the first electrode thereof may be taken as the drain and the second electrode may be taken as the source, which are not distinguished herein. In addition, the on level and the off level in the embodiments of the present invention are both used in a general sense. The on level refers to any level that can turn on the transistor, and the off level refers to any level that can switch off/turn off the transistor.

In the embodiments of the present application, the term “electrically connected” may refer to a direct electrical connection between two components or an electrical connection between two components via one or more other components.

In the embodiments of the present application, a first node, a second node, and a third node are only defined for the convenience of description of a circuit structure, and none of the first node, the second node, and the third node is an actual circuit unit.

It will be apparent to those skilled in the art that various modifications and variations can be made in the present application without departing from the spirit or scope of the present application. Thus, the present application is intended to cover modifications and variations of the present application which fall within the scope of the appended claims (claimed technical solution) and their equivalents. It is to be noted that implementations provided in the embodiments of the present application may be combined with each other in case of no contradiction.

Before the technical solutions provided in the embodiments of the present application are elaborated, in order to facilitate understanding of the embodiments of the present application, the problems existing in the related art are first specifically explained in the present application.

As described above, with the continuous development of display technologies, OLED display products have been more and more widely used, and people have higher and higher requirements for these display products. However, the usage performance of current OLED display products is required to be improved. Specifically, the inventor of the present application has found that poor display occurs when a light-emitting device displays low grayscale (low brightness).

The inventor of the present application has found through further research that, at present, due to continuous iterative updates of material systems of the OLED device, luminous efficiency of the device is getting higher and higher, and a driving current of a pixel circuit under the same grayscale brightness is getting lower and lower. In this way, characteristic fluctuations (such as electrical fluctuations, size fluctuations, or film thickness fluctuations) of the transistor in the pixel circuit may have a greater impact on low brightness and low grayscale, thereby leading to degradation in display image quality under low brightness and low grayscale. In view of this, how to better improve display quality under low brightness and low grayscale is one of the current problems required to be solved in current-controlled pixel drive circuits.

In order to solve the above technical problem, the embodiments of the present application provide a pixel circuit and a display module. It should be noted that the embodiments provided in the present application are not intended to limit the scope disclosed in the present application.

The pixel circuit provided in the embodiments of the present application is first introduced below. Referring to FIG. 1, FIG. 1 is a schematic structural diagram of a pixel circuit according to an embodiment of the present application. As shown in FIG. 1, the pixel circuit 10 includes a driving module 101 and a shunt branch 11.

Specifically, the driving module 101 is electrically connected to a first electrode of a light-emitting element D. The driving module 101 is configured to drive the light-emitting element D to emit light. The first electrode may be an anode of the light-emitting element D, which is not strictly limited herein in this embodiment.

A first terminal of the shunt branch 11 is electrically connected to the first electrode of the light-emitting element D, a second terminal of the shunt branch 11 is electrically connected to a first reference voltage signal line Vref1, and the shunt branch 11 may be configured to transmit part of a driving current provided by the driving module 101 to the first reference voltage signal line Vref1.

As can be seen from the above description, an embodiment of the present application provides a pixel circuit 10. The pixel circuit 10 includes a driving module 101 and a shunt branch 11. The driving module 101 is electrically connected to a first electrode of a light-emitting element D, and may be configured to drive the light-emitting element D to emit light. A first terminal of the shunt branch 11 is electrically connected to the first electrode of the light-emitting element D, a second terminal of the shunt branch 11 is electrically connected to a first reference voltage signal line Vref1, and the shunt branch may be configured to transmit part of a driving current provided by the driving module 101 to the first reference voltage signal line Vref1.

Compared with the prior art, in the pixel circuit 10 provided in the embodiments of the present application, the driving current provided by the driving module 101 is shunted through the shunt branch 11, so that one part of the driving current is transmitted to the light-emitting element D to drive the light-emitting element D to emit light, and the other part of the driving current is transmitted to the first reference voltage signal line Vref1, which helps to make the current flowing through the driving module 101 larger, equivalent to indirectly increasing a total current flowing through the driving module 101 through shunting.

In this way, characteristic fluctuations of electronic devices inside the pixel circuit 10 have a relatively small impact on the current, so that brightness of the light-emitting element D driven by the pixel circuit 10 reaches expected brightness, thereby improving brightness uniformity at low grayscale brightness and improving image quality, and then helping to alleviate the problem of uneven display on the display panel.

Next, still referring to FIG. 1, according to some embodiments of the present application, in consideration of actual application requirements, in order to ensure flexible controllability of current shunting of the pixel circuit in different display working scenarios, the shunt branch 11 includes a shunt switch module 102.

In the structure as shown in FIG. 1, a control terminal of the shunt switch module 102 is electrically connected to a target control signal line EN, a first terminal of the shunt switch module 102 is electrically connected to the first electrode of the light-emitting element D, and a second terminal of the shunt switch module 102 is electrically connected to the first reference voltage signal line Vref1.

The shunt switch module 102 may be configured to be turned on or turned off under the control of the target control signal line EN. When a signal provided by the target control signal line EN is at an enable level, the shunt switch module 102 is turned on and transmits part of the driving current provided by the driving module 101 to the first reference voltage signal line Vref1.

As an example, the driving module 101 may include a first transistor T1, and the shunt switch module 102 may include an eighth transistor T8. A gate of the eighth transistor T8 may receive the signal provided by the target control signal line EN. A first electrode of the eighth transistor T8 is electrically connected to the anode of the light-emitting element D, and a second electrode of the eighth transistor T8 is electrically connected to the first reference voltage signal line Vref1. The signal provided by the target control signal line EN may be a pulse signal, and the eighth transistor T8 is controlled to be turned on or turned off through high and low levels (an enable level and a disable level) of the pulse signal.

Figure 2:
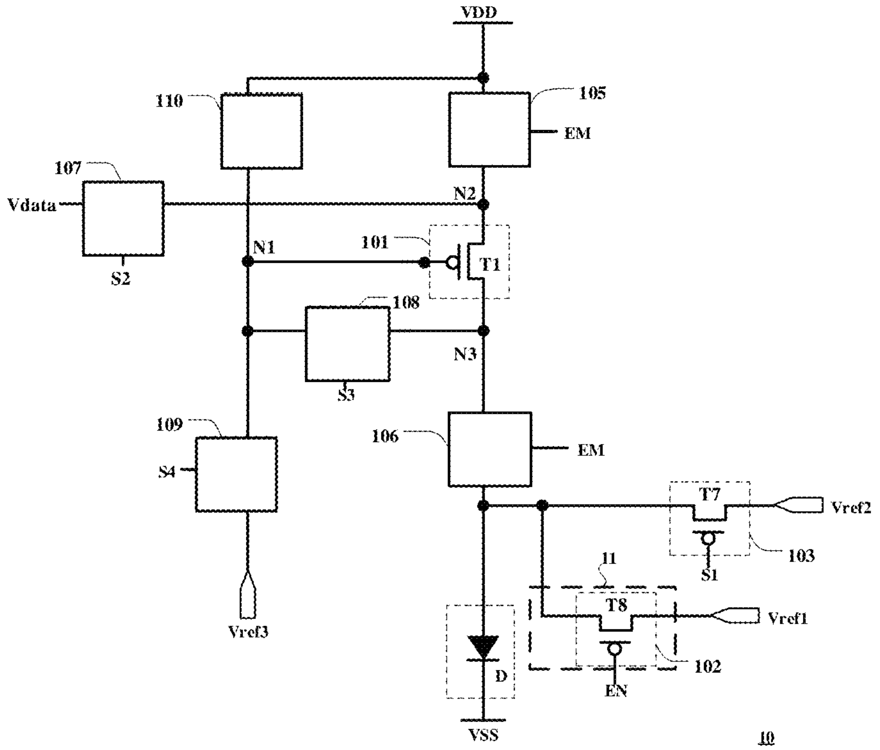
FIG. 2 is a schematic structural diagram of another pixel circuit according to an embodiment of the present application.

Next, referring to FIG. 2, FIG. 2 is a schematic structural diagram of another pixel circuit 10 according to an embodiment of the present application. According to some embodiments of the present application, optionally, the pixel circuit 10 further includes a first reset module 103.

As shown in FIG. 2, a control terminal of the first reset module 103 is electrically connected to a first scanning signal line S1, a first terminal of the first reset module 103 is electrically connected to the first electrode of the light-emitting element D, and a second terminal of the first reset module 103 is electrically connected to a second reference voltage signal line Vref2.

The first reset module 103 may be configured to be turned on under the control of the first scanning signal line S1, and transmit a second reference voltage signal on the second reference voltage signal line Vref2 to the first electrode of the light-emitting element D, so as to reset the first electrode of the light-emitting element D.

According to some embodiments of the present application, more specifically, in consideration of specific operation timing of the pixel circuit, in order to more reasonably realize a shunt function of the shunt switch module 102 and ensure a normal reset operation of the first reset module 103 on the light-emitting element D, the shunt switch module 102 is turned on at a light-emitting stage of the light-emitting element D, and the first reset module 103 is turned on at a first reset stage. The first reset stage does not overlap the light-emitting stage in time.

In this embodiment, the driving module 101 may provide a current at the light-emitting stage to drive the light-emitting element D to emit light. If the shunt switch module 102 is turned on at the light-emitting stage, the current of the driving module 101 can be effectively shunted, thereby achieving a purpose of increasing "grayscale brightness" of the pixel circuit in a disguised manner and helping to alleviate the problem of uneven display on the display panel.

At the first reset stage not overlapping the light-emitting stage, the first reset module 103 is turned on to perform a reset initialization operation on the light-emitting element D. At the first reset stage, the shunt switch module 102 remains off, which can effectively prevent a current loss due to connection of the first reference voltage signal line Vref1 when the light-emitting element D is reset, thereby helping to ensure stability and reliability of the reset operation on the light-emitting element D.

Still referring to FIG. 2, according to some embodiments of the present application, optionally, a second electrode of the light-emitting element D is electrically connected to a first power voltage signal line VSS. A power voltage signal provided by the first power voltage signal line VSS may be a fixed negative voltage signal at, for example, −5 V. The first reference voltage signal line Vref1 and the first power voltage signal line VSS are different signal lines.

More specifically, in different brightness display scenarios, requirements for a voltage value of the above first reference voltage signal may not be consistent. In consideration of this, a first reference voltage signal transmitted by the first reference voltage signal line Vref1 may be a voltage signal with a variable voltage value. It should be understood that the voltage signal transmitted by the first reference voltage signal line may be flexibly changed according to actual shunting requirements in different display scenarios, which is not specifically limited herein in this embodiment.

According to some embodiments of the present application, optionally, considering that uneven image display on the display panel is more likely to occur in low-grayscale and low-brightness scenarios, a specific scenario in which the shunt switch module 102 is turned on is set in a targeted manner in the present application, so as to minimize display power consumption while effectively improving the display quality.

Specifically, when brightness of the light-emitting element D connected to the pixel circuit 10 is less than or equal to a first preset brightness threshold, the shunt switch module 102 is turned on under the control of the target control signal line EN. Moreover, optionally, when the brightness of the light-emitting element D connected to the pixel circuit 10 is greater than the first preset brightness threshold, the shunt switch module 102 is turned off under the control of the target control signal line EN.

During specific implementation, for example, prior to display of an image frame, there is generally a need to first acquire an image parameter (such as an image grayscale value or brightness value) of a to-be-displayed image and then determine, according to the image parameter, brightness to be actually displayed by each pixel in the display panel.

In this embodiment, exemplarily, if it is detected that the brightness of the light-emitting element D connected to the pixel circuit 10 is less than the first preset brightness threshold, it indicates that the pixel circuit 10 is in a low-grayscale and low-brightness display scenario. In this case, the target control signal line EN outputs an enable level, so that the shunt switch module 102 is turned on in response to the enable level provided by the target control signal line EN, so as to shunt the current flowing through the driving module 101.

On the contrary, if it is detected that the brightness of the light-emitting element D connected to the pixel circuit 10 is greater than the first preset brightness threshold, it indicates that the pixel circuit 10 is in a high-brightness display scenario and there may be less need to increase the "grayscale brightness" of the pixel circuit in a disguised manner through the above shunting. In this case, the target control signal line EN outputs an off level, so that the shunt switch module 102 remains off in response to the enable level provided by the target control signal line EN.

It is to be noted that the first preset brightness threshold may be flexibly set according to factors such as relevant personnel's experience in dealing with display unevenness, actual display requirements, or different panel characteristics, which is not specifically limited in the present application.

According to some embodiments of the present application, optionally, for similar reasons to the foregoing embodiments, considering that uneven image display on the display panel is more likely to occur in low-grayscale and low-brightness scenarios, in this embodiment, in order to more fully reduce the display power consumption while effectively improving the display quality, it is also proposed: if the brightness of the light-emitting element D connected to the pixel circuit 10 is less than or equal to the first preset brightness threshold, the first reference voltage signal line may stop transmitting the first reference voltage signal, or transmit the first reference voltage signal with a voltage value lower than a first voltage threshold. The first voltage threshold may be flexibly set according to factors such as relevant personnel's experience in dealing with display unevenness, actual display requirements, or different panel characteristics, which is not specifically limited in the present application.

According to some embodiments of the present application, more specifically, considering that requirements for a degree of shunting of the current flowing through the driving module 101 may not be consistent in different brightness display scenarios, a signal value of the voltage signal of the first reference voltage signal line Vref1 may be adjusted to meet various shunting requirements in the different display brightness scenarios.

Specifically, in this embodiment, when the brightness of the light-emitting element D connected to the pixel circuit 10 is first brightness, the first reference voltage signal line Vref1 transmits a first reference voltage signal with a first voltage value. When the brightness of the light-emitting element D connected to the pixel circuit 10 is second brightness, the first reference voltage signal line Vref1 transmits the first reference voltage signal with a second voltage value. The first brightness and the second brightness are both less than or equal to the first preset brightness threshold, the first brightness is different from the second brightness, and the first voltage value is different from the second voltage value.

According to some embodiments of the present application, optionally, in order to enable image brightness in different display brightness scenarios to reach expected brightness as much as possible, if the first brightness is less than the second brightness, the first voltage value is less than the second voltage value. In other words, in the case that the brightness is lower than or equal to the first preset brightness threshold, the lower the brightness is, then the smaller the voltage value of the first reference voltage signal transmitted by the first reference voltage signal line Vref1 is.

Specifically, in this embodiment, if the voltage value of the first reference voltage signal is smaller, a larger proportion of the current flowing through the driving module 101 is shunted by the shunt branch 11, and there is a greater increase in the total current flowing through the driving module 101. In this way, it is beneficial for more effectively achieving the purpose of increasing the "grayscale brightness" of the pixel circuit in a disguised manner in low-grayscale and low-brightness scenarios, thereby helping to fully improve the display quality and the display effect of the display panel.

According to some embodiments of the present application, optionally, in consideration of an actual display scenario, in order to more reasonably determine whether the brightness of the light-emitting element D connected to the pixel circuit 10 is less than or equal to the first preset brightness threshold, the brightness of the light-emitting element D connected to the pixel circuit 10 being less than or equal to a first preset brightness threshold includes at least one of: a brightness level of a display panel where the pixel circuit 10 is located being less than or equal to a first brightness level threshold, a grayscale of the light-emitting element D connected to the pixel circuit 10 being less than or equal to a first grayscale threshold, an average value of grayscales of a plurality of subpixels in a display image frame on the display panel where the pixel circuit is located being less than or equal to a second grayscale threshold, a number of the subpixels, whose grayscales are less than or equal to the first grayscale threshold, in the display image frame on the display panel where the pixel circuit is located being greater than a first number threshold, or a number of the subpixels, whose grayscales are greater than the first grayscale threshold, in the display image frame on the display panel where the pixel circuit is located being less than or equal to a second number threshold.

Specifically, in the field of display technologies, the display panel often has different brightness levels, a same grayscale at different brightness levels shows different brightness, and different grayscales at a same brightness level show different brightness.

Based on this, the brightness of the light-emitting element D connected to the pixel circuit 10 being less than or equal to a first preset brightness threshold may include: a brightness level of a display panel where the pixel circuit 10 is located being less than or equal to a first brightness level threshold. In this way, through current shunting at a low brightness level, the problem of uneven display quality of the display panel at the low brightness level is alleviated.

Additionally/alternatively, the brightness of the light-emitting element D connected to the pixel circuit 10 being less than or equal to a first preset brightness threshold may include: a grayscale of the light-emitting element D connected to the pixel circuit 10 being less than or equal to a first grayscale threshold. In this way, the above shunting operation is performed for low-grayscale scenarios at different brightness levels, so as to ameliorate the defect of display unevenness in the low-grayscale scenarios.

Additionally/alternatively, the brightness of the light-emitting element D connected to the pixel circuit 10 being less than or equal to a first preset brightness threshold may include: an average value of grayscales of a plurality of subpixels in a display image frame on the display panel where the pixel circuit is located being less than or equal to a second grayscale threshold. Specifically, the grayscales of the subpixels may be determined after the display image frame on the display panel is acquired, and the average value of the grayscales of the plurality of subpixels in the image data is calculated. If the average value of the grayscales of the plurality of subpixels in the display image frame on the display panel is less than or equal to the second grayscale threshold, it indicates that an overall grayscale of the image data is low. In this case, the problem of uneven display quality of low-grayscale images can be alleviated by shunting the driving current.

Additionally/alternatively, the brightness of the light-emitting element D connected to the pixel circuit 10 being less than or equal to a first preset brightness threshold may include: a number of the subpixels, whose grayscales are less than or equal to the first grayscale threshold, in the display image frame on the display panel where the pixel circuit is located being greater than a first number threshold. Specifically, the grayscales of the subpixels may be determined after the display image frame on the display panel is acquired, and statistics is conducted on a number of subpixels, whose grayscales are less than or equal to the first grayscale threshold, in a plurality of subpixels in the image data. If the number obtained by statistics is greater than the first number threshold, it may still indicate that the overall grayscale of the image data is low. In this case, the problem of uneven display quality of low-grayscale images can be alleviated by shunting the driving current.

Additionally/alternatively, the brightness of the light-emitting element D connected to the pixel circuit 10 being less than or equal to a first preset brightness threshold may include: a number of the subpixels, whose grayscales are greater than the first grayscale threshold, in the display image frame on the display panel where the pixel circuit is located being less than or equal to a second number threshold. Specifically, the grayscales of the subpixels may be determined after the display image frame on the display panel is acquired, and statistics is conducted on a number of subpixels, whose grayscales are greater than the first grayscale threshold, in the plurality of subpixels in the image data. If the number obtained by statistics is greater than the first number threshold, it may still indicate that the overall grayscale of the image data is low. In this case, the problem of uneven display quality of low-grayscale images can be alleviated by shunting the driving current.

It should be added that in some feasible embodiments, further, at least two of the brightness level of the display panel, the grayscale of the light-emitting element D connected to the pixel circuit 10, the average value of grayscales of the plurality of subpixels in the display image frame on the display panel, the number of the subpixels, whose grayscales are less than or equal to the first grayscale threshold, in the display image frame on the display panel, and the number of the subpixels, whose grayscales are greater than the first grayscale threshold, in the display image frame on the display panel may be combined to start a current shunting operation in the low-brightness and low-grayscale scenarios in a more targeted manner. In this way, an influence of screen power consumption caused by the above shunting operation can be further reduced, and at the same time, the display quality of the display panel in the low-brightness and low-grayscale scenarios can be effectively guaranteed.

According to some embodiments of the present application, correspondingly, the brightness of the light-emitting element D connected to the pixel circuit 10 being greater than a first preset brightness threshold includes at least one of: a brightness level of a display panel where the pixel circuit 10 is located being greater than a first brightness level threshold, a grayscale of the light-emitting element D connected to the pixel circuit 10 being greater than a first grayscale threshold, an average value of grayscales of a plurality of subpixels in a display image frame on the display panel being greater than a second grayscale threshold, a number of the subpixels, whose grayscales are less than or equal to the first grayscale threshold, in the display image frame on the display panel being less than or equal to a first number threshold, or a number of the subpixels, whose grayscales are greater than the first grayscale threshold, in the display image frame on the display panel being greater than a second number threshold.

Herein, it should be understood that this embodiment relates to relevant content of how to determine that the brightness of the light-emitting element D connected to the pixel circuit 10 is greater than the first preset brightness threshold, which corresponds to the implementation principle and the implementations of determining that the brightness of the light-emitting element D connected to the pixel circuit 10 is less than or equal to the first preset brightness threshold in the foregoing embodiments, and is not described in detail herein in this embodiment for the sake of brevity.

Moreover, specific values of the first brightness level threshold, the first grayscale threshold, the second grayscale threshold, the first number threshold, and the second number threshold may be flexibly set according to factors such as relevant personnel's experience in dealing with display unevenness, actual display requirements, or different panel characteristics, which are not specifically limited in the present application.

Figure 3:
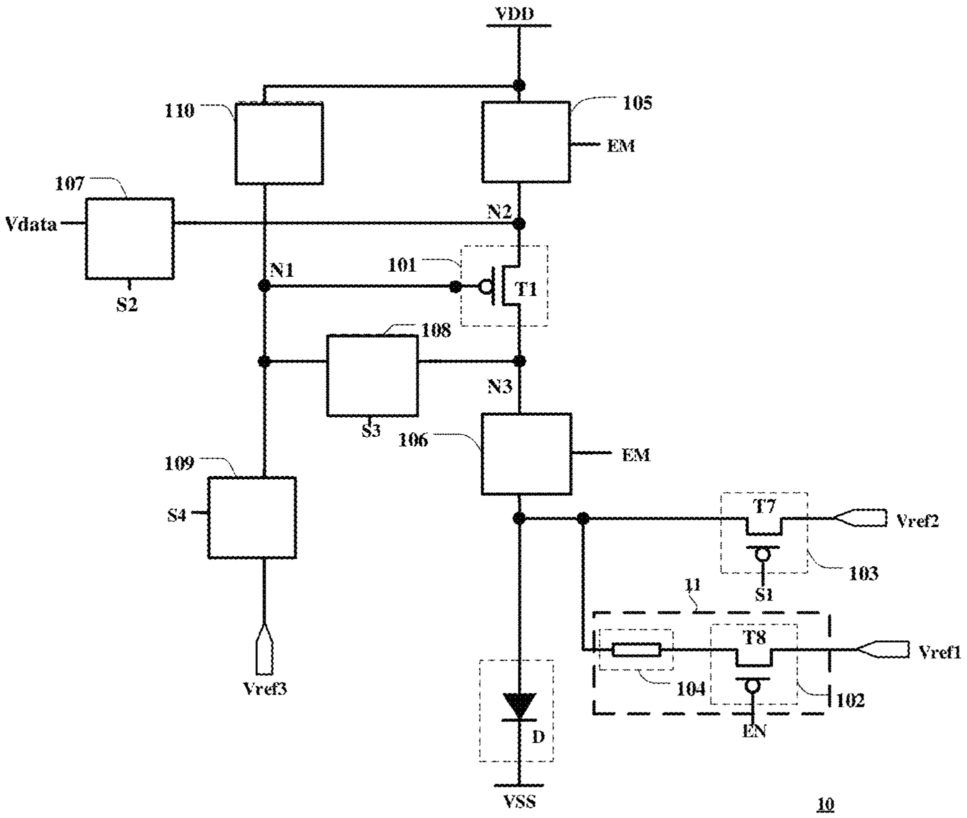
FIG. 3 is a schematic structural diagram of yet another pixel circuit according to an embodiment of the present application.

Next, referring to FIG. 3, FIG. 3 is a schematic structural diagram of yet another pixel circuit 10 according to an embodiment of the present application. As shown in FIG. 3, according to some embodiments of the present application, optionally, in order to more reasonably realize the operation of shunting the driving current provided by the driving module 101 based on the shunt branch 11, the shunt branch 11 may further include a voltage dividing module 104.

During a specific connection, the voltage dividing module 104 is electrically connected between the first terminal of the shunt switch module 102 and the first electrode of the light-emitting element D (as shown in FIG. 3), or the voltage dividing module 104 is electrically connected between the second terminal of the shunt switch module 102 and the first reference voltage signal line Vref1.

In this embodiment, by arranging the voltage dividing module 104 in the shunt branch 11 for voltage division, a situation where a node potential of the first electrode of the light-emitting element D is the same as the voltage signal provided by the first reference voltage signal line Vref1 during the shunting can be effectively prevented, which helps to ensure a normal light-emitting operation of the light-emitting element D connected to the pixel circuit 10.

According to some embodiments of the present application, more specifically, the voltage dividing module 104 includes a resistor. Impedance of the resistor may be a fixed value, and the resistor may be, for example, a semiconductor resistor, which is not strictly limited herein.

In this embodiment, when resistive impedance of the resistor is smaller, a larger proportion of the driving current provided by the driving module 101 is shunted by the shunt branch 11, and it is more beneficial for indirectly increasing the total current flowing through the driving module 101 during an actual driving operation.

In this way, when the total current flowing through the driving module 101 is larger, characteristic fluctuations of the electronic devices inside the pixel circuit 10 may affect the current less, which is more helpful for making the brightness of the light-emitting element driven by the pixel circuit reach the expected brightness, thereby alleviating the problem of uneven display.

According to some embodiments of the present application, optionally, if the impedance of the resistor is excessively large, a smaller proportion of the driving current provided by the driving module 101 is shunted by the shunt branch 11, the shunting effect is less obvious, and it is less helpful in improving the display quality. In consideration of this, in order to effectively ensure the shunting effect of the shunt branch 11 on the current provided by the driving module 101, impedance of the voltage dividing module 104 is less than or equal to impedance of the light-emitting element D.

Figure 4:
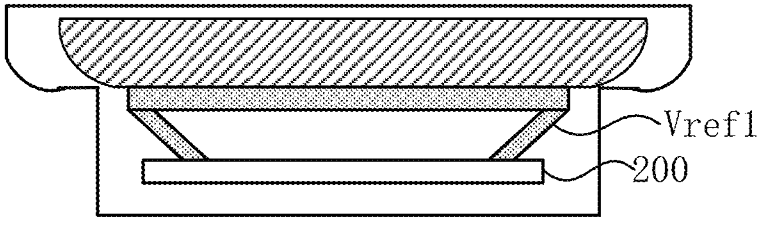
FIG. 4 is a schematic diagram of a structure between a first reference voltage signal line and a power module according to an embodiment of the present application.

Next, referring to FIG. 4, FIG. 4 is a schematic diagram of a structure between a first reference voltage signal line Vref1 and a power module 200 according to an embodiment of the present application. As shown in FIG. 4, according to some embodiments of the present application, optionally, the first reference voltage signal line Vref1 is electrically connected to a first reference voltage signal output terminal of the power module 200. The power module 200 may be, for example, a DDIC, which is not excessively limited herein.

In this embodiment, when the display panel performs display, the first reference voltage signal line Vref1 is controlled by the power module 200 in a linked manner. When it is detected that the current is required to be shunted through the first reference voltage signal line Vref1, the power module 200 provides a first reference voltage signal with a corresponding voltage value for the first reference voltage signal line Vref1.

According to some embodiments of the present application, more specifically, the shunt branches 11 of at least two pixel circuits 10 are electrically connected to the first reference voltage signal output terminal through a same first reference voltage signal line Vref1. In other words, the first reference voltage signal lines Vref1 connected to a plurality of pixel circuits 10 are in communication with each other.

Figure 5:
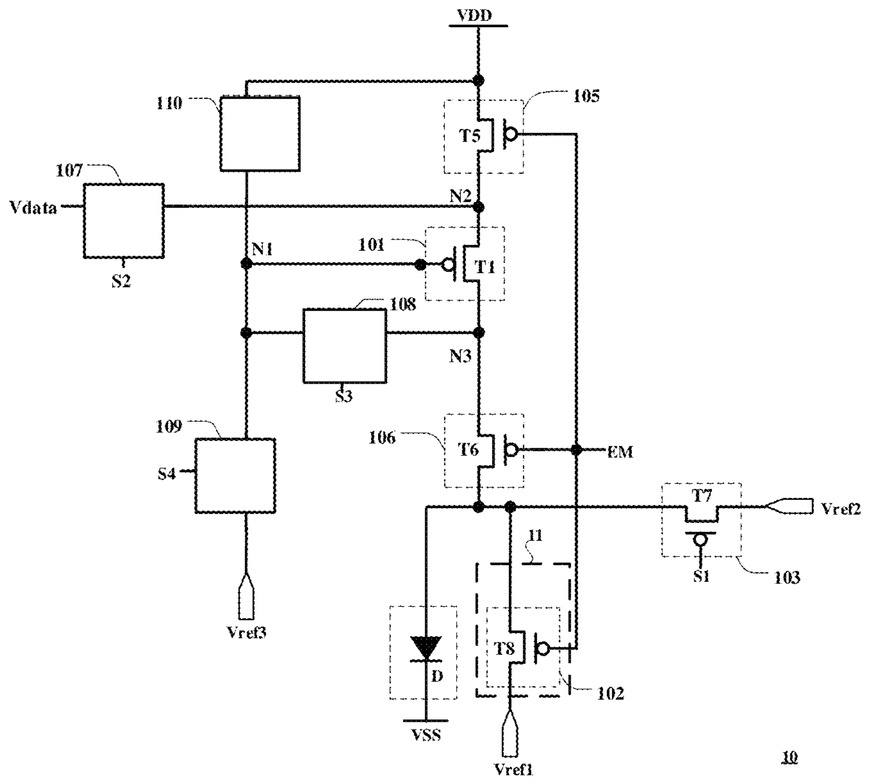
FIG. 5 is a schematic structural diagram of yet another pixel circuit according to an embodiment of the present application.

Next, referring to FIG. 5, FIG. 5 is a schematic structural diagram of yet another pixel circuit 10 according to an embodiment of the present application. As shown in FIG. 5, according to some embodiments of the present application, optionally, a control terminal of the driving module 101 is electrically connected to a first node N1, a first terminal of the driving module 101 is electrically connected to a second node N2, and a second terminal of the driving module 101 is electrically connected to a third node N3.

The pixel circuit 10 further includes at least one of a first light-emitting control module 105 or a second light-emitting control module 106. In an example shown in FIG. 5, the pixel circuit 10 includes both the first light-emitting control module 105 and the second light-emitting control module 106.

During a specific connection, a control terminal of the first light-emitting control module 105 is electrically connected to a light-emitting control signal line EM, a first terminal of the first light-emitting control module 105 is electrically connected to a second power voltage signal line VDD, and a second terminal of the first light-emitting control module 105 is electrically connected to the second node N2. A power voltage signal provided by the second power voltage signal line VDD may be a positive voltage signal.

A control terminal of the second light-emitting control module 106 is electrically connected to the light-emitting control signal line EM, a first terminal of the second light-emitting control module 106 is electrically connected to the third node N3, and a second terminal of the second light-emitting control module 106 is electrically connected to the first electrode of the light-emitting element D.

At the light-emitting stage of the light-emitting element D connected to the pixel circuit 10, the light-emitting control signal line EM provides an on level. The first light-emitting control module 105 and the second light-emitting control module 106 are turned on under the control of the light-emitting control signal line EM, so that the light-emitting element D emits light.

Still referring to FIG. 5, according to some embodiments of the present application, optionally, in order to achieve reasonable reuse of signal lines in the display panel to save wiring space and wiring costs, the light-emitting control signal line EM may be specifically reused as the target control signal line EN. Alternatively, in order to meet flexible control requirements for different functional modules in the pixel circuit 10, the target control signal line EN and the light-emitting control signal line EM may be two different signal lines.

In this embodiment, the control terminals of the shunt switch module 102, the first light-emitting control module 105, and the second light-emitting control module 106 are all electrically connected to the light-emitting control signal line EM. At the light-emitting stage of the light-emitting element D, the light-emitting control signal line EM transmits the on level as provided respectively to the control terminals of the shunt switch module 102, the first light-emitting control module 105, and the second light-emitting control module 106, so that the above modules are turned on at the light-emitting stage. In this way, the reuse of the light-emitting control signal line EM as the target control signal line EN can save wiring space and a number of signal lines, and can also effectively ensure that the shunt switch module 102 can shunt the current provided by the driving module 101 while the light-emitting element D emits light normally.

According to some embodiments of the present application, optionally, the target control signal line EN is electrically connected to the control terminals of the shunt switch modules 102 of at least two rows of pixel circuits 10, and each row of pixel circuits 10 includes a plurality of pixel circuits 10 arranged along a row direction. In other words, the control terminals of the shunt switch modules 102 in a plurality of rows of pixel circuits 10 may be electrically connected to a same target control line EN.

According to some embodiments of the present application, optionally, in order to effectively reduce shunt power consumption in high-brightness scenarios, if the target control signal line EN and the light-emitting control signal line EM are two different signal lines, when the brightness of the light-emitting element D connected to the pixel circuit 10 is greater than the first preset brightness threshold, the first reference voltage signal line Vref1 may not transmit the first reference voltage signal. That is, the first reference voltage signal line Vref1 may be in a suspended state. Additionally/alternatively, if the target control signal line EN and the light-emitting control signal line EM are two different signal lines, when the brightness of the light-emitting element D connected to the pixel circuit 10 is greater than the first preset brightness threshold, the shunt switch module 102 may be turned off under the control of the target control signal line EN.

Figure 6:
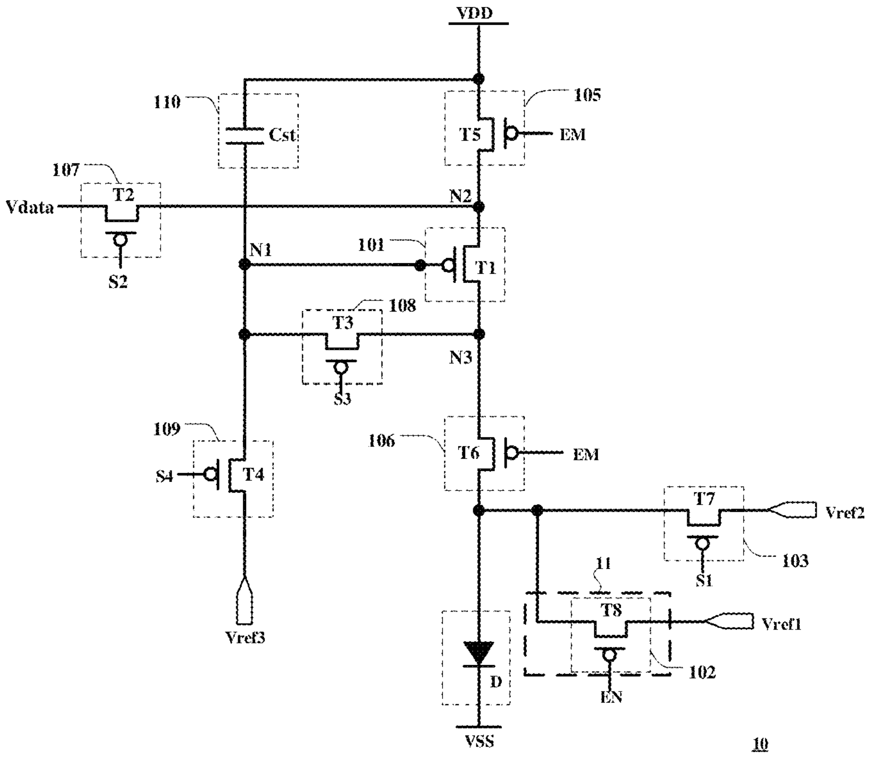
FIG. 6 is a schematic structural diagram of yet another pixel circuit according to an embodiment of the present application.

Next, referring to FIG. 6, FIG. 6 is a schematic structural diagram of yet another pixel circuit 10 according to an embodiment of the present application. As shown in FIG. 6, according to some embodiments of the present application, optionally, the pixel circuit 10 further includes a data writing module 107, a threshold compensation module 108, a second reset module 109, and a storage module 110. Specific structures of the above modules are introduced below.

A control terminal of the data writing module 107 is electrically connected to a second scanning signal line S2, a first terminal of the data writing module 107 is electrically connected to a data signal line Vdata, and a second terminal of the data writing module 107 is electrically connected to the second node N2.

A control terminal of the threshold compensation module 108 is electrically connected to a third scanning signal line S3, a first terminal of the threshold compensation module 108 is electrically connected to the first node N1, and a second terminal of the threshold compensation module 108 is electrically connected to the third node N3.

A control terminal of the second reset module 109 is electrically connected to a fourth scanning signal line S4, a first terminal of the second reset module 109 is electrically connected to the first node N1, a second terminal of the second reset module 109 is electrically connected to a third reference voltage signal line Vref3, and the second reset module 109 is configured to be turned on under the control of the fourth scanning signal line S4, transmit a third reference voltage signal on the third reference voltage signal line Vref3 to the first node N1, and reset the first node N1.

A first terminal of the storage module 110 is electrically connected to the second power voltage signal line VDD, and a second terminal of the storage module 110 is electrically connected to the first node N1.

In order to facilitate understanding of the pixel circuit 10 provided in the present application, description is provided below in conjunction with some specific application embodiments. Still referring to FIG. 6, the driving module 101 may include a first transistor T1, the data writing module 107 may include a second transistor T2, the threshold compensation module 108 may include a third transistor T3, the storage module may include a storage capacitor Cst., and the second reset module 109 may include a fourth transistor T4, the first light-emitting control module 105 may include a fifth transistor T5, the second light-emitting control module 106 may include a sixth transistor T6, the first reset module 103 may include a seventh transistor T7, and the shunt switch module 102 may include an eighth transistor T8. Moreover, in order to reduce an influence of leakage, the third transistor T3 and the fourth transistor T4 may both be indium gallium zinc oxide (IGZO) transistors, which is not specifically limited in the present application.

In order to facilitate understanding of the operating process of the pixel circuit 10 provided in FIG. 6, reference may be made to FIG. 7 below. Corresponding to the pixel circuit shown in FIG. 6, FIG. 7 is a schematic timing diagram of a pixel circuit 10 according to an embodiment of the present application.

Figure 7:
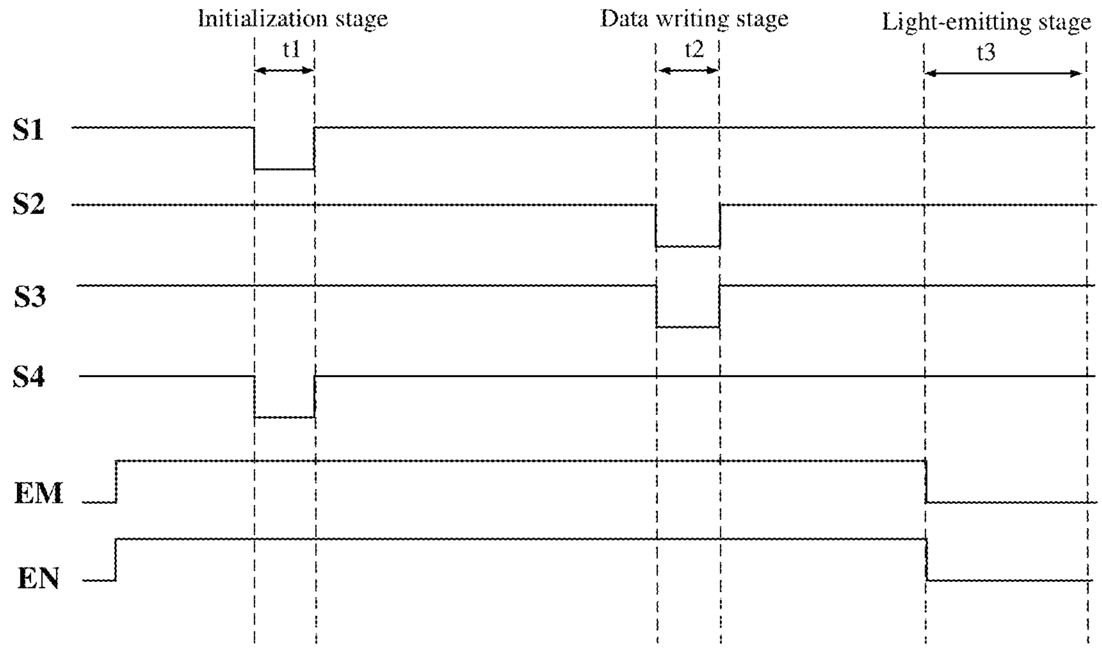
FIG. 7 is a schematic timing diagram of a pixel circuit according to an embodiment of the present application.

As shown in FIG. 7, in some embodiments, specific operating stages of the pixel circuit 10 shown in FIG. 6 may include: an initialization stage t1, a data writing stage t2, and a light-emitting stage t3.

At the initialization stage t1, the first transistor T1 may be turned on under the control of the first scanning signal line S1, transmit the second reference voltage signal on the second reference voltage signal line Vref2 to the first electrode of the light-emitting element D, and reset the first electrode of the light-emitting element D. The fourth transistor T4 may be turned on under the control of the fourth scanning signal line S4, transmit the third reference voltage signal on the third reference voltage signal line Vref3 to the first node N1, and reset the first node N1.

At the data writing stage t2, the second transistor T2 may be turned on under the control of the second scanning signal line S2, the third transistor T3 may be turned on under the control of the third scanning signal line S3, and a data signal of the data signal line Vdata is written into the first node N1 sequentially through the second transistor T2, the first transistor T1, and the third transistor T3, completing writing of the data signal and compensation for a threshold voltage of the first transistor T1.

At the light-emitting stage t3, the fifth transistor T5 and the sixth transistor T6 are turned on under the control of the light-emitting control signal line EM, and a driving current of the first transistor T1 is transmitted to the first electrode of the light-emitting element D through the sixth transistor T6 to drive the light-emitting element D to emit light.

It is to be noted that this embodiment is different from the conventional pixel circuit in that the eighth transistor T8 is provided in the pixel circuit 10 shown in FIG. 7. A gate of the eighth transistor T8 is electrically connected to the target control signal line EN, a first electrode of the eighth transistor T8 is electrically connected to the anode of the light-emitting element D, and a second electrode of the eighth transistor T8 is electrically connected to the first reference voltage signal line Vref1.

At the light-emitting stage shown in FIG. 7, the signal provided by the target control signal line EN is at an enable level, and the eighth transistor T8 is turned on under the control of the target control signal line EN and transmits part of the driving current provided by the first transistor T1 to the first reference voltage signal line Vref1.

For the sake of brevity, the specific operating process of the pixel circuit 10 will not be elaborated in this embodiment.

It may be understood that driving timing given in the embodiments of the present application is only a possible example, and in some other embodiments, operating timing of the pixel circuit may be flexibly adjusted according to an actual situation and requirements, which is not specifically limited herein in the present application.

Figure 8:
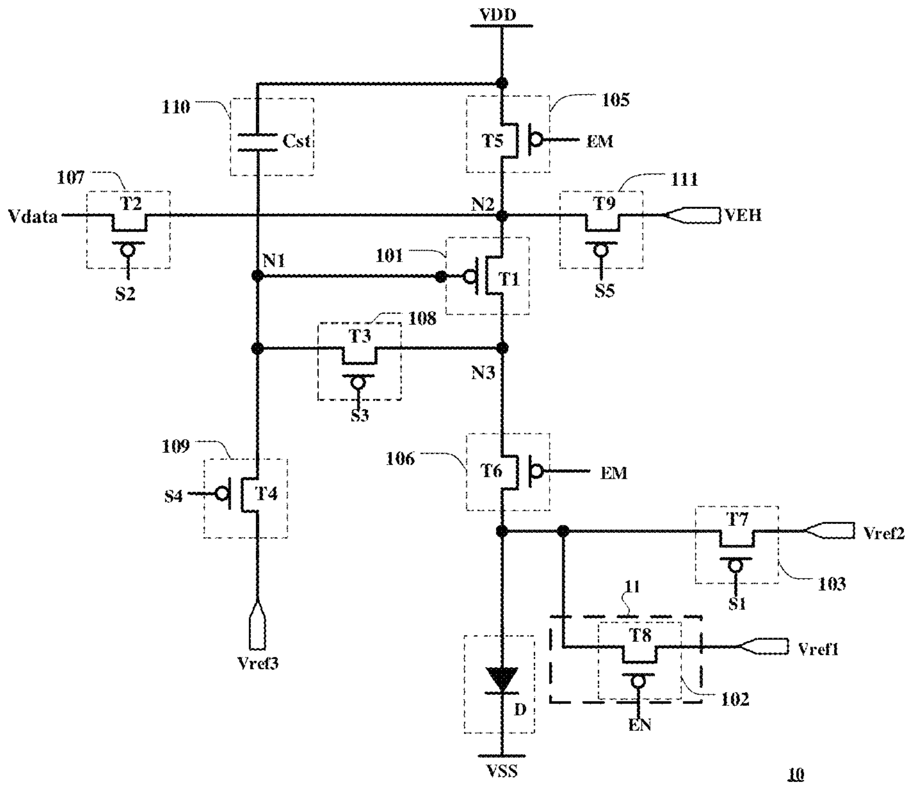
FIG. 8 is a schematic structural diagram of yet another pixel circuit according to an embodiment of the present application.

Next, referring to FIG. 8, FIG. 8 is a schematic structural diagram of yet another pixel circuit 10 according to an embodiment of the present application. As shown in FIG. 8, according to some embodiments of the present application, optionally, in order to further improve the display effect of the display panel, the pixel circuit 10 further includes a bias adjustment module 111. A control terminal of the bias adjustment module 111 is electrically connected to a fifth scanning signal line S5, a first terminal of the bias adjustment module 111 is electrically connected to a bias voltage signal line VEH, and a second terminal of the bias adjustment module 111 is electrically connected to the second node N2 or the third node N3. The bias adjustment module may be configured to adjust a bias state of the driving module 101. As an example, the bias adjustment module 111 may specifically include a ninth transistor T9. The first scanning signal line S1 may be reused as the fifth scanning signal line S5. That is, the first scanning signal line S1 and the fifth scanning signal line S5 are a same scanning signal line.

It may be understood that for reasons similar to the foregoing embodiments, and considering the wide application of an 8T1C basic pixel structure in the field of panels, for the sake of brevity, specific operating processes of other devices in the pixel circuit shown in FIG. 8 are not described in detail in this embodiment.

It is to be noted that in addition to the pixel circuit structures listed above, the pixel circuit 10 in the present application may further include other numbers of electronic devices having other connection relationships, and such electronic devices (such as transistors and capacitors) together constitute various types of pixel circuits, which is not specifically limited in the present application.

Based on the pixel circuit provided in the above embodiments, an embodiment of the present application provides a display module including a display panel, and the display panel includes the pixel circuit as provided in any one of the foregoing implementations in the present application. The display panel provided in the embodiments of the present application may be an active-matrix organic light-emitting diode (AMOLED), an OLED, or the like. Those skilled in the art should understand that in other implementations of the present application, the display panel may alternatively be a micro LED display panel, a quantum dot display panel, or the like.

Figure 9:
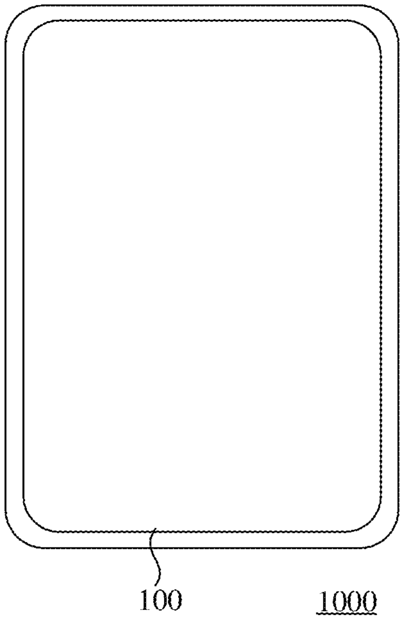
FIG. 9 is a schematic structural diagram of a display module according to an embodiment of the present application.

Next, referring to FIG. 9, FIG. 9 is a schematic structural diagram of a display module according to an embodiment of the present application. As shown in FIG. 9, the display module 1000 provided in this embodiment of the present application may include the display panel 100 as described in any one of the above embodiments. The display panel 100 includes the pixel circuit as described in any one of the above embodiments. The display module 1000 provided in this embodiment of the present application has the beneficial effects of the pixel circuit provided in the embodiments of the present application, which may be obtained specifically with reference to the specific description of the pixel circuit in the above embodiments. Details are not described herein again in this embodiment.

Figure 10:
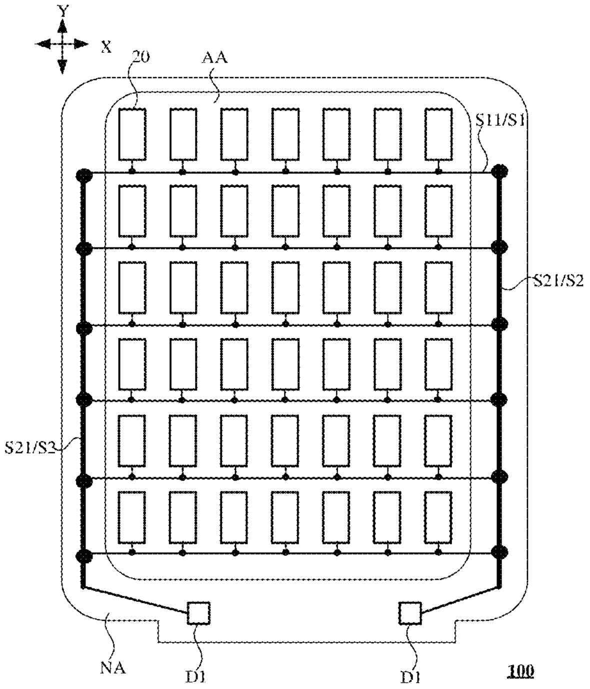
FIG. 10 is a schematic structural diagram of a display panel according to an embodiment of the present application.

Next, referring to FIG. 10, FIG. 10 is a schematic structural diagram of a display panel 100 according to an embodiment of the present application. As shown in FIG. 10, the display panel 100 includes a display area AA and a non-display area NA. The display area AA may be configured to display an image, and the non-display area NA may be configured to arrange wiring or the like. The display area AA includes a plurality of subpixels 20 arranged in an array. The subpixel 20 includes the pixel circuit and the light-emitting element as described in any one of the foregoing embodiments.

In this embodiment, the first reference voltage signal line may specifically include a secondary line S1 located in the display area AA and a primary line S2 located in the non-display area NA. The secondary line S1 is electrically connected to a plurality of pixel circuits, and the secondary line S1 receives a first reference voltage signal through the primary line S2. It is to be noted that thicknesses of the lines in FIG. 10 and subsequent figures are only to better distinguish various traces, and are not intended to limit actual widths of the various traces.

Still referring to FIG. 10, according to some embodiments of the present application, more specifically, in the example shown in FIG. 10, the secondary line S1 may include a plurality of first wiring portions S11 extending along a first direction X, and one of the first wiring portions S11 is electrically connected to a plurality of pixel circuits arranged along the first direction X. The primary line S2 includes a first primary line S21 extending along a second direction Y. The first direction X intersects the second direction Y, and the first wiring portions S11 are electrically connected to the first primary line S21. One first primary line S21 may be provided, or two first primary lines may be arranged on two opposite side bezels as shown in FIG. 10, which is not strictly limited in the present application.

It is to be noted that in the example shown in FIG. 10, the description is based on an example in which the first direction X is a row direction and the second direction Y is a column direction, but is not limited thereto.

Figure 11:
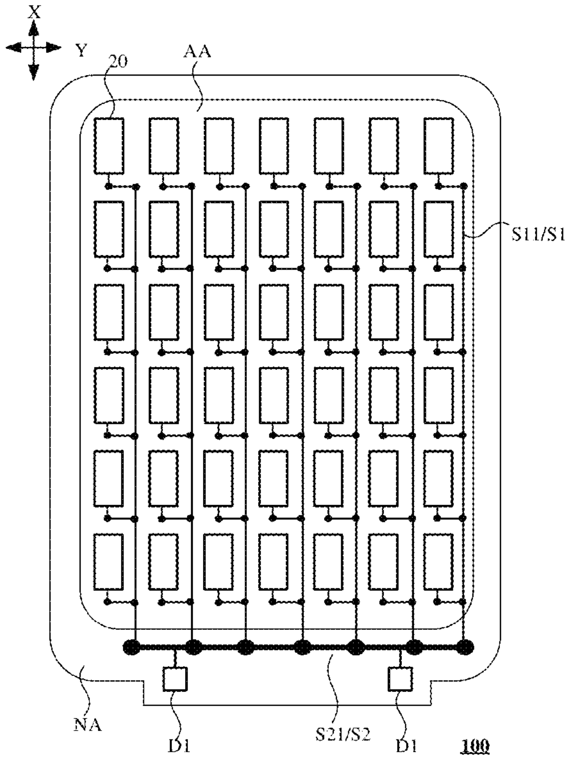
FIG. 11 is a schematic structural diagram of another display panel according to an embodiment of the present application.

In some feasible implementations, referring to FIG. 11, FIG. 11 is a schematic structural diagram of a display panel 100 according to an embodiment of the present application. As shown in FIG. 11, the first direction X is a column direction, and the second direction Y is a row direction. In this case, the secondary line S1 may include a plurality of first wiring portions S11 extending along the first direction X (the column direction), and one of the first wiring portions S11 is electrically connected to a plurality of pixel circuits arranged along the first direction X. The primary line S2 includes a first primary line S21 extending along the second direction Y (the row direction). The first direction X intersects the second direction Y, and the first wiring portions S11 are electrically connected to the first primary line S21.

On the whole, in the structure shown in FIG. 10 or FIG. 11, there are only horizontal or vertical first wiring portions S11 in the display area AA, which can effectively ensure the shunt function of each pixel circuit and can also save the number of signal lines and layout space in the display area AA as much as possible, and can be more beneficial for improving overall competitiveness of the display panel.

Figure 12:
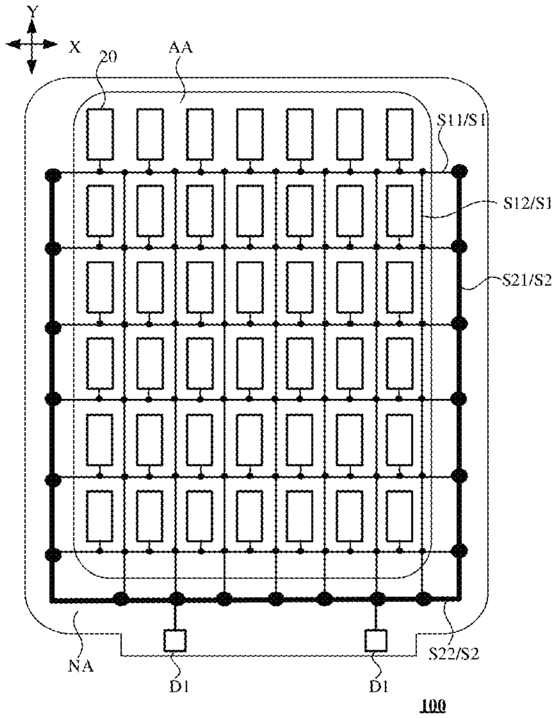
FIG. 12 is a schematic structural diagram of yet another display panel according to an embodiment of the present application.

Next, referring to FIG. 12, FIG. 12 is a schematic structural diagram of a display panel 100 according to an embodiment of the present application. As shown in FIG. 12, according to some embodiments of the present application, optionally, in addition to the plurality of first wiring portions S11 extending along the first direction X, the secondary line SI may further include a plurality of second wiring portions S12 extending along the second direction Y. Any two adjacent second wiring portions S12 are separated by the pixel circuit, and the second wiring portions S12 are electrically connected to the plurality of first wiring portions S11.

Still referring to FIG. 12, according to some embodiments of the present application, optionally, in addition to the first primary line S21 extending along the second direction Y, the primary line S2 may further include a second primary line S22 extending along the first direction X, and the first primary line S21 and the plurality of second wiring portions S12 are electrically connected to the second primary line S22.

In this embodiment, by arranging the plurality of first wiring portions S11, the plurality of second wiring portions S12, the first primary line S21, and the second primary line S22 in the structure shown in FIG. 12 in the display panel, the first reference voltage signal lines are arranged in a mesh shape, which can effectively improve a driving capability of the first reference voltage signal line and help to enhance a shunting capability of the pixel circuit, thereby fully improving the image quality of the display panel.

Still referring to any one of FIG. 10, FIG. 11, and FIG. 12, according to some embodiments of the present application, optionally, based on an actual display module structure, in order to realize output of the first reference voltage signal more reasonably, the display module 1000 further includes a power module. As shown in FIG. 10, a first reference voltage signal output terminal D1 of the power module is electrically connected to the primary line S2. In this way, the secondary line S1 can be electrically connected to the first reference voltage signal output terminal D1 of the power module through the primary line S2, thereby receiving a first reference voltage signal provided by the first reference voltage signal output terminal D1.

Moreover, more specifically, the power module may include a DDIC or a PMIC. A specific selection of the DDIC or the PMIC may be determined according to different requirements and chip characteristics in actual application scenarios, which is not excessively limited in this embodiment.

Figure 13:
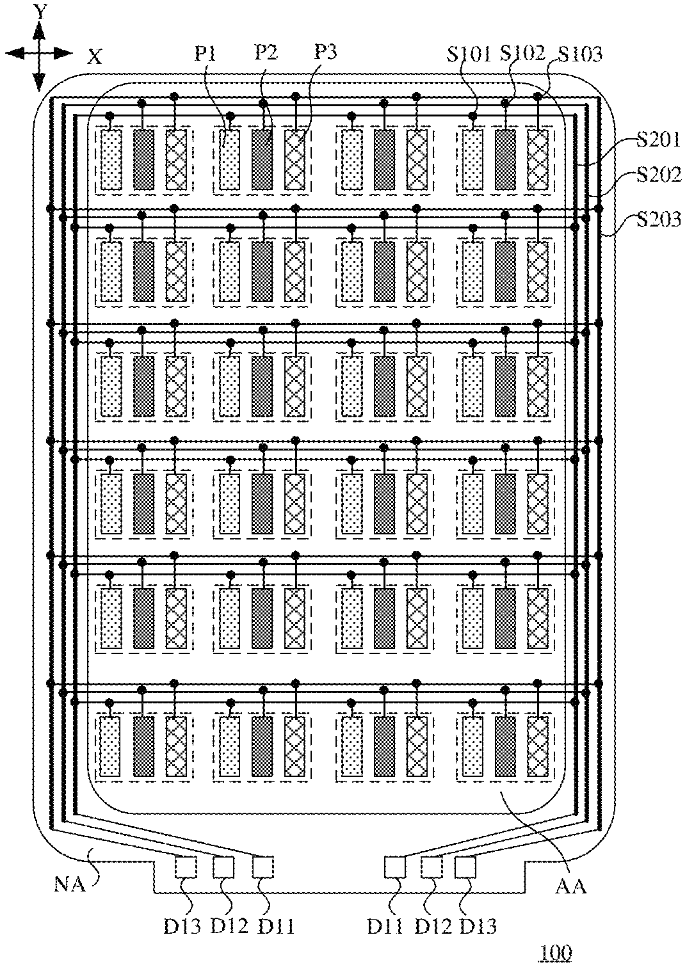
FIG. 13 is a schematic structural diagram of still another display panel according to an embodiment of the present application.

Next, referring to FIG. 13, FIG. 13 is a schematic structural diagram of a display panel 100 according to an embodiment of the present application. As shown in FIG. 13, according to some embodiments of the present application, optionally, the display panel 100 includes first-color subpixels P1, second-color subpixels P2, and third-color subpixels P3, and the first-color subpixels P1, the second-color subpixels P2, and the third-color subpixels P3 are located in the display area AA of the display panel 100.

The secondary line S1 includes a first sub-secondary line S101, a second sub-secondary line S102, and a third sub-secondary line S103. The primary line S2 includes a first sub-primary line S201, a second sub-primary line S202, and a third sub-primary line S203.

The first reference voltage signal includes a first sub-reference voltage signal, a second sub-reference voltage signal, and a third sub-reference voltage signal. The first sub-secondary line S101 is electrically connected to the pixel circuits of a plurality of first-color subpixels P1 in the display area AA, and the first sub-secondary line S101 receives the first sub-reference voltage signal through the first sub-primary line S201.

The second sub-secondary line S102 is electrically connected to the pixel circuits of a plurality of second-color subpixels P2 in the display area, and the second sub-secondary line S102 receives the second sub-reference voltage signal through the second sub-primary line S202. The third sub-secondary line S103 is electrically connected to the pixel circuits of a plurality of third-color subpixels P3 in the display area AA, and the third sub-secondary line S103 receives the third sub-reference voltage signal through the third sub-primary line S203.

Voltage values of the first sub-reference voltage signal, the second sub-reference voltage signal, and the third sub-reference voltage signal may be the same or different, which is not strictly limited in the present application and may be specifically set based on luminous characteristics of subpixels of different colors and shunting requirements.

In this embodiment, according to different colors of the subpixels in the display area AA, the first reference voltage signal is divided into the first sub-reference voltage signal, the second sub-reference voltage signal, and the third sub-reference voltage signal, so that three types of reference voltage signals respectively corresponding to the first-color subpixels P1, the second-color subpixels P2, and the third-color subpixels P3 are formed on the whole, which is beneficial for achieving fine control over degrees of shunting for the subpixels of different colors, is more beneficial for making the brightness of the light-emitting element in each subpixel in the display panel reach the expected brightness, and is more beneficial for alleviating the problem of uneven display on the display panel.

According to some embodiments of the present application, optionally, the first-color subpixels P1 include red subpixels, the second-color subpixels P2 include green subpixels, and the third-color subpixels P3 include blue subpixels. In some other embodiments, the first-color subpixels P1 may alternatively be green subpixels or blue subpixels, which is not specifically limited in this embodiment.

Still referring to FIG. 13, according to some embodiments of the present application, optionally, based on an actual display module structure, in order to realize output of the first sub-reference voltage signal, the second sub-reference voltage signal, and the third sub-reference voltage signal more reasonably so that the brightness of the light-emitting element in each subpixel in the display panel can reach the expected brightness, the display module 1000 may further include a power module.

As shown in FIG. 13, the first reference voltage signal output terminal D1 of the power module may include a first sub-reference voltage signal output terminal D11, a second sub-reference voltage signal output terminal D12, and a third sub-reference voltage signal output terminal D13. The first sub-reference voltage signal output terminal D11 is electrically connected to the first sub-primary line S21, the second sub-reference voltage signal output terminal D12 is electrically connected to the second sub-primary line S22, and the third sub-reference voltage signal output terminal D13 is electrically connected to the third sub-primary line S23.

Specifically, the first sub-secondary line S101 is electrically connected to the pixel circuits of a plurality of first-color subpixels Pl in the display area AA, and the first sub-secondary line S101 is electrically connected to the first sub-reference voltage signal output terminal D11 through the first sub-primary line S201.

The second sub-secondary line S102 is electrically connected to the pixel circuits of a plurality of second-color subpixels P2 in the display area AA, and the second sub-secondary line S102 is electrically connected to the second sub-reference voltage signal output terminal D12 through the second sub-primary line S202.

The third sub-secondary line S103 is electrically connected to the pixel circuits of a plurality of third-color subpixels P3 in the display area AA, and the third sub-secondary line S103 is electrically connected to the third sub-reference voltage signal output terminal D13 through the third sub-primary line S203.

In this embodiment, the first reference voltage signal line is divided according to the colors of the subpixels in the display area AA, thereby forming three sets of mesh wires respectively corresponding to the first-color subpixels P1, the second-color subpixels P2, and the third-color subpixels P3 on the whole. Voltage values on the mesh wires corresponding to the subpixels of different colors may be provided by the first sub-reference voltage signal output terminal D11, the second sub-reference voltage signal output terminal D12, and the third sub-reference voltage signal output terminal D13 of the power module respectively.

This also indicates that if voltage signals outputted by the first sub-reference voltage signal output terminal D11, the second sub-reference voltage signal output terminal D12, and the third sub-reference voltage signal output terminal D13 have different signal values, voltage values of the first reference voltage signals used for current shunting of the subpixels of different colors may be different. In this way, a purpose of finely controlling the currents in the subpixels of different colors can be achieved, which is more beneficial for making the brightness of the light-emitting element in each subpixel in the display panel reach the expected brightness and is more beneficial for alleviating the problem of uneven display on the display panel.

According to some embodiments of the present application, optionally, in consideration of display scenarios of partitions of the display panel, brightness display situations of different display partitions may not be consistent. Based on this, in order to achieve fine adjustment on brightness of different display areas, the display panel 100 includes a display area AA and a non-display area NA, the display area AA includes M partitions, each of the partitions includes at least one subpixel 20, and the subpixel 20 includes the pixel circuit and the light-emitting element, where M is an integer greater than 1.

The display module 1000 includes M first reference voltage signal lines, one of the first reference voltage signal lines corresponds to one of the partitions, and the one of the first reference voltage signal lines is electrically connected to the pixel circuit in the corresponding partition. Voltage values of the first reference voltage signals received by the M first reference voltage signal lines are the same or different.

More specifically, the display module 1000 may further include a power module. The power module may include at least M first reference voltage signal output terminals D1, and the M first reference voltage signal output terminals D1 are electrically connected to the M first reference voltage signal lines in one-to-one correspondence.

In this embodiment, by dividing the display area AA into a plurality of partitions, the pixel circuit in each partition is connected to one first reference voltage signal line corresponding to the partition, and each first reference voltage signal line is electrically connected to the first reference voltage signal output terminal D1 corresponding thereto. In this way, through different first reference voltage signal lines and the first reference voltage signal output terminals D1 corresponding thereto, first reference voltage signals with different voltage values can be provided for different partitions, which can achieve a purpose of finely controlling the currents of the pixel circuits in different partitions, and is more beneficial for making brightness of the light-emitting element in each partition in the display panel reach brightness expected by the partition, thereby further helping to alleviate the problem of uneven display on the display panel.

According to some embodiments of the present application, optionally, considering that uneven image display on the display panel is more likely to occur in low-grayscale and low-brightness scenarios, a transmission scenario of the first reference voltage signal is set in a targeted manner in the present application, so as to minimize display power consumption while effectively improving the display quality.

Specifically, the display panel 100 includes a display area AA and a non-display area Na, a plurality of subpixels 20 arranged in an array are located in the display area AA, and the subpixel 20 including the pixel circuit and the light-emitting element. When target brightness of the display panel 100 is less than or equal to a first preset brightness threshold, a first reference voltage signal is transmitted to the first reference voltage signal line through the first reference voltage signal output terminal D1.

During specific implementation, for example, prior to display of an image frame, there is generally a need to first acquire image data of a to-be-displayed image on the display panel. After the image data is acquired, target brightness of the display panel may be determined according to the image data, so as to determine according to the target brightness whether there is a need to transmit the first reference voltage signal to the first reference voltage signal line through the first reference voltage signal output terminal D1.

More specifically, the target brightness of the display panel 100 includes average brightness of a plurality of subpixels 20 in the display panel 100. That is, the target brightness is an average value of brightness of the plurality of subpixels in the display panel 100. However, it should be understood that the above manner of determining the target brightness is merely a possible example and should not substantially limit the target brightness in the present application.

According to some embodiments of the present application, optionally, in order to facilitate reasonable shunting control over the pixel circuit in each subpixel, the shunt branch in the pixel circuit includes a shunt switch module, a control terminal of the shunt switch module is electrically connected to a target control signal line, a first terminal of the shunt switch module is electrically connected to the first electrode of the light-emitting element, a second terminal of the shunt switch module is electrically connected to the first reference voltage signal line, and the target control signal line is electrically connected to a power module.

According to some embodiments of the present application, more specifically, when the target brightness of the display panel 100 is less than or equal to the first preset brightness threshold, the target control signal line transmits an enable level, so that the corresponding shunt switch module is turned on, thereby realizing a shunting operation on the subpixels in the display panel in a scenario such as low grayscale and low brightness and effectively improving the display quality of the display panel.

According to some embodiments of the present application, correspondingly, when the target brightness of the display panel 100 is greater than the first preset brightness threshold, the target control signal line transmits a disable level, so that the corresponding shunt switch module remains off, thereby stopping a shunting operation on the subpixels in the display panel in a scenario such as high grayscale and high brightness and helping to reduce display power consumption in such a scenario.

According to some embodiments of the present application, optionally, target brightness of the display panel 100 being less than or equal to the first preset brightness threshold includes at least one of: a brightness level of the display panel 100 being less than or equal to a first brightness level threshold, an average value of grayscales of a plurality of subpixels 20 in a display image frame on the display panel 100 being less than or equal to a second grayscale threshold, a number of the subpixels 20, whose grayscales are less than or equal to a first grayscale threshold, in the display image frame on the display panel 100 being greater than a first number threshold, or a number of the subpixels 20, whose grayscales are greater than the first grayscale threshold, in the display image frame on the display panel 100 being less than or equal to a second number threshold.

It is to be added that the grayscales of the subpixels in the display panel 100 may refer to grayscales of corresponding subpixels in a display image frame on the display panel. Moreover, it should be understood that for the sake of brevity, a specific implementation process of some of the above embodiments may be obtained with reference to the corresponding description hereinabove. Details are not described herein again.

According to some embodiments of the present application, optionally, considering that uneven image display on the display panel is more likely to occur in low-grayscale and low-brightness scenarios, in this embodiment, in order to more fully reduce the display power consumption while effectively improving the display quality, when target brightness of the display panel 100 is greater than a first preset brightness threshold, the first reference voltage signal line does not transmit a first reference voltage signal. That is, the first reference voltage signal line Vref1 may be in a suspended state. Additionally/alternatively, if the target control signal line and the light-emitting control signal line are two different signal lines, when the target brightness of the display panel 100 is greater than the first preset brightness threshold, the shunt switch module 102 may be turned off under the control of the target control signal line EN.

According to some embodiments of the present application, correspondingly, target brightness of the display panel being greater than the first preset brightness threshold includes at least one of: a brightness level of the display panel being greater than a first brightness level threshold, an average value of grayscales of a plurality of subpixels in a display image frame on the display panel being greater than a second grayscale threshold, a number of the subpixels, whose grayscales are less than or equal to a first grayscale threshold, in the display image frame on the display panel being less than or equal to a first number threshold, or a number of the subpixels, whose grayscales are greater than the first grayscale threshold, in the display image frame on the display panel being greater than a second number threshold.

According to some embodiments of the present application, optionally, more specifically, considering that requirements for degrees of shunting of driving currents of the subpixels may not be consistent in different brightness display scenarios, different first reference voltage signals may be transmitted by the first reference voltage signal line to meet various shunting requirements in the different display brightness scenarios.

Specifically, in this embodiment, when the target brightness of the display panel 100 is first target brightness, the first reference voltage signal line transmits the first reference voltage signal with a first target voltage value; when the target brightness of the display panel is second target brightness, the first reference voltage signal line transmits the first reference voltage signal with a second target voltage value; the first target brightness and the second target brightness are both less than or equal to the first preset brightness threshold, the first target brightness is different from the second target brightness, and the first target voltage value is different from the second target voltage value.

According to some embodiments of the present application, optionally, in order to enable image brightness in different display brightness scenarios to reach expected brightness as much as possible, if the first target brightness is less than the second target brightness, the first target voltage value is less than the second target voltage value.

Specifically, in this embodiment, if the voltage value of the target brightness is smaller, the voltage value of the first reference voltage signal transmitted by the first reference voltage signal line is set to be smaller, and the degree of shunting is higher. In this way, the image quality may be more obviously improved by shunting, which is more beneficial for more effectively achieving the purpose of increasing the "grayscale brightness" of the pixel circuit in the display panel in a low-grayscale and low-brightness scenario, thereby helping to fully improve the display quality and the display effect of the display panel.

It may be understood that the display module provided in the embodiments of the present application may be installed on a display apparatus, and the display apparatus may be a wearable product, a computer, a television, a vehicle-mounted display apparatus, or other display apparatuses with display functions, which is not specifically limited in the present application. The display apparatus provided in the embodiments of the present application has the beneficial effects of the pixel circuit/display panel provided in the foregoing embodiments of the present application, which may be obtained specifically with reference to the specific description of the pixel circuit/display panel in the above embodiments. Details are not described herein again in this embodiment.

It should be understood that the specific structure of the circuit and the sectional structure of the display panel provided in the drawings of the embodiments of the present application are only some examples and are not intended to limit the present application. In addition, the above embodiments provided in the present application can be combined with each other without contradiction.

It should be made clear that various embodiments in the specification are described progressively. Same and similar parts among the embodiments may be referred to one another, and each embodiment focuses on differences from other embodiments. In accordance with the disclosed embodiments, as described above, these embodiments are not intended to be exhaustive or to limit the present application to the specific embodiments disclosed. Obviously, many modifications and variations are possible according to the above description. The embodiments are chosen and described in the specification in order to best explain the principles and the practical application of the present application, so as to enable those skilled in the art to best utilize the present application and modifications based on the present application. The present application is to be limited only by the claims and full scope and equivalents thereof.

Those skilled in the art will appreciate that the above embodiments are illustrative and not restrictive. Different technical features that appear in different embodiments can be combined to achieve a beneficial effect. Embodiments with other variations for the disclosed embodiments can be understood and practiced by those skilled in the art after those skilled in the art understand the drawings, the specification and the claims. In the claims, the phrase "comprise"

does not exclude other structures; the indefinite article "a/an" does not exclude more than one; and the terms "first" and "second" are used to label names rather than illustrate any particular order. Any reference sign in the claims should not be construed as limiting the protection scope. Existence of certain technical features in different dependent claims does not mean that these technical features cannot be combined to achieve a beneficial effect.

What is claimed is:

1. A pixel circuit, comprising:

a driving module electrically connected to a first electrode of a light-emitting element and configured to drive the light-emitting element to emit light; and a shunt branch, wherein a first terminal of the shunt branch is electrically connected to the first electrode of the light-emitting element, a second terminal of the shunt branch is electrically connected to a first reference voltage signal line, and the shunt branch is configured to transmit part of a driving current provided by the driving module to the first reference voltage signal line, the shunt branch comprises a shunt switch module, a control terminal of the shunt switch module is electrically connected to a target control signal line, a first terminal of the shunt switch module is electrically connected to the first electrode of the light-emitting element, a second terminal of the shunt switch module is electrically connected to the first reference voltage signal line, and the shunt switch module is configured to be turned on or turned off under the control of the target control signal line; and wherein the shunt branch further comprises a voltage dividing module, the voltage dividing module is electrically connected between the first terminal of the shunt switch module and the first electrode of the light-emitting element, or the voltage dividing module is electrically connected between the second terminal of the shunt switch module and the first reference voltage signal line;

wherein the voltage dividing module comprises a resistor;

impedance of the voltage dividing module is less than or equal to impedance of the light-emitting element;

the first reference voltage signal line is electrically connected to a first reference voltage signal output terminal of a power module; and shunt branches of at least two pixel circuits are electrically connected to the first reference voltage signal output terminal through a same first reference voltage signal line.

2. The pixel circuit according to claim 1, wherein a first reference voltage signal transmitted by the first reference voltage signal line is a voltage signal with a variable voltage value.

3. The pixel circuit according to claim 1, further comprising a first reset module, wherein a control terminal of the first reset module is electrically connected to a first scanning signal line, a first terminal of the first reset module is electrically connected to the first electrode of the light-emitting element, a second terminal of the first reset module is electrically connected to a second reference voltage signal line, and the first reset module is configured to be turned on under the control of the first scanning signal line, transmit a second reference voltage signal on the second reference voltage signal line to the first electrode of the light-emitting element, and reset the first electrode of the light-emitting element.

4. The pixel circuit according to claim 3, wherein the shunt switch module is turned on at a light-emitting stage of the light-emitting element, the first reset module is turned on at a first reset stage, and the first reset stage does not overlap the light-emitting stage in time.

5. The pixel circuit according to claim 3, wherein a second electrode of the light-emitting element is electrically connected to a first power voltage signal line, and the first reference voltage signal line and the first power voltage signal line are different signal lines.

6. The pixel circuit according to claim 1, wherein when brightness of the light-emitting element connected to the pixel circuit is less than or equal to a first preset brightness threshold, the shunt switch module is turned on under the control of the target control signal line;

when the brightness of the light-emitting element connected to the pixel circuit is first brightness, the first reference voltage signal line transmits a first reference voltage signal with a first voltage value; when the brightness of the light-emitting element connected to the pixel circuit is second brightness, the first reference voltage signal line transmits the first reference voltage signal with a second voltage value; the first brightness and the second brightness are both less than or equal to the first preset brightness threshold, the first brightness is different from the second brightness, and the first voltage value is different from the second voltage value; and the first brightness is less than the second brightness, and the first voltage value is less than the second voltage value.

7. The pixel circuit according to claim 6, wherein brightness of the light-emitting element connected to the pixel circuit being less than or equal to a first preset brightness threshold comprises at least one of:

a brightness level of a display panel where the pixel circuit is located being less than or equal to a first brightness level threshold, a grayscale of the light-emitting element connected to the pixel circuit being less than or equal to a first grayscale threshold, an average value of grayscales of a plurality of subpixels in a display image frame on the display panel where the pixel circuit is located being less than or equal to a second grayscale threshold, a number of the subpixels, whose grayscales are less than or equal to the first grayscale threshold, in the display image frame on the display panel where the pixel circuit is located being greater than a first number threshold, or a number of the subpixels, whose grayscales are greater than the first grayscale threshold, in the display image frame on the display panel where the pixel circuit is located being less than or equal to a second number threshold.

8. The pixel circuit according to claim 1, wherein when brightness of the light-emitting element connected to the pixel circuit is greater than a first preset brightness threshold, the first reference voltage signal line does not transmit a first reference voltage signal, and the shunt switch module is turned off under the control of the target control signal line; and brightness of the light-emitting element connected to the pixel circuit being greater than a first preset brightness threshold comprises at least one of:

a brightness level of a display panel where the pixel circuit is located being greater than a first brightness level threshold, a grayscale of the light-emitting element connected to the pixel circuit being greater than a first grayscale threshold, an average value of grayscales of a plurality of subpixels in a display image frame on the display panel where the pixel circuit is located being greater than a second grayscale threshold, a number of the subpixels, whose grayscales are less than or equal to the first grayscale threshold, in the display image frame on the display panel where the pixel circuit is located being less than or equal to a first number threshold, or a number of the subpixels, whose grayscales are greater than the first grayscale threshold, in the display image frame on the display panel where the pixel circuit is located being greater than a second number threshold.

9. The pixel circuit according to claim 1, wherein a control terminal of the driving module is electrically connected to a first node, a first terminal of the driving module is electrically connected to a second node, and a second terminal of the driving module is electrically connected to a third node;

the pixel circuit further comprises at least one of a first light-emitting control module or a second light-emitting control module, wherein a control terminal of the first light-emitting control module is electrically connected to a light-emitting control signal line, a first terminal of the first light-emitting control module is electrically connected to a second power voltage signal line, and a second terminal of the first light-emitting control module is electrically connected to the second node;

a control terminal of the second light-emitting control module is electrically connected to the light-emitting control signal line, a first terminal of the second light-emitting control module is electrically connected to the third node, and a second terminal of the second light-emitting control module is electrically connected to the first electrode of the light-emitting element;

the light-emitting control signal line is reused as the target control signal line, or the target control signal line and the light-emitting control signal line are two different signal lines; and the target control signal line is electrically connected to control terminals of shunt switch modules of at least two rows of pixel circuits, each row of pixel circuits comprising a plurality of pixel circuits arranged along a row direction.

10. The pixel circuit according to claim 9, wherein the pixel circuit further comprises:

a data writing module, wherein a control terminal of the data writing module is electrically connected to a second scanning signal line, a first terminal of the data writing module is electrically connected to a data signal line, and a second terminal of the data writing module is electrically connected to the second node;

a threshold compensation module, wherein a control terminal of the threshold compensation module is electrically connected to a third scanning signal line, a first terminal of the threshold compensation module is electrically connected to the first node, and a second terminal of the threshold compensation module is electrically connected to the third node;

a second reset module, wherein a control terminal of the second reset module is electrically connected to a fourth scanning signal line, a first terminal of the second reset module is electrically connected to the first node, a second terminal of the second reset module is electrically connected to a third reference voltage signal line, and the second reset module is configured to be turned on under the control of the fourth scanning signal line, transmit a third reference voltage signal on the third reference voltage signal line to the first node, and reset the first node; and a storage module, wherein a first terminal of the storage module is electrically connected to the second power voltage signal line, and a second terminal of the storage module is electrically connected to the first node.

11. The pixel circuit according to claim 9, further comprising:

a bias adjustment module, wherein a control terminal of the bias adjustment module is electrically connected to a fifth scanning signal line, a first terminal of the bias adjustment module is electrically connected to a bias voltage signal line, and a second terminal of the bias adjustment module is electrically connected to the second node or the third node.

12. A display module comprising a display panel, the display panel comprising the pixel circuit according to claim 1.

13. The display module according to claim 12, wherein the display panel comprises a display area and a non-display area, the display area comprising a plurality of subpixels arranged in an array, the subpixel comprising the pixel circuit and the light-emitting element;

the first reference voltage signal line comprises a secondary line located in the display area and a primary line located in the non-display area, wherein the secondary line is electrically connected to a plurality of pixel circuits, and the secondary line receives a first reference voltage signal through the primary line; and the secondary line comprises a plurality of first wiring portions extending along a first direction, one of the first wiring portions is electrically connected to a plurality of pixel circuits arranged along the first direction, and the primary line comprises a first primary line extending along a second direction, the first direction intersects the second direction, and the first wiring portions are electrically connected to the first primary line.

14. The display module according to claim 13, wherein the secondary line further comprises a plurality of second wiring portions extending along the second direction, any two adjacent second wiring portions are separated by the pixel circuit, and the second wiring portions are electrically connected to the plurality of first wiring portions;

the primary line further comprises a second primary line extending along the first direction, and the first primary line and the plurality of second wiring portions are electrically connected to the second primary line;

the display module further comprises a power module, and a first reference voltage signal output terminal of the power module is electrically connected to the primary line; and the power module comprises a display driver integrated circuit (DDIC) or a power management integrated circuit (PMIC).

15. The display module according to claim 13, wherein the display panel comprises first-color subpixels, second-color subpixels, and third-color subpixels, the first-color subpixels, the second-color subpixels, and the third-color subpixels are located in the display area of the display panel, the secondary line comprises a first sub-secondary line, a second sub-secondary line, and a third sub-secondary line, the primary line comprises a first sub-primary line, a second sub-primary line, and a third sub-primary line, and the first reference voltage signal comprises a first sub-reference voltage signal, a second sub-reference voltage signal, and a third sub-reference voltage signal;

the first sub-secondary line is electrically connected to the pixel circuits of a plurality of first-color subpixels in the display area, and the first sub-secondary line receives the first sub-reference voltage signal through the first sub-primary line;

the second sub-secondary line is electrically connected to the pixel circuits of a plurality of second-color subpixels in the display area, and the second sub-secondary line receives the second sub-reference voltage signal through the second sub-primary line;

the third sub-secondary line is electrically connected to the pixel circuits of a plurality of third-color subpixels in the display area, and the third sub-secondary line receives the third sub- reference voltage signal through the third sub-primary line;

the first-color subpixels comprise red subpixels, the second-color subpixels comprise green subpixels, and the third-color subpixels comprise blue subpixels; and the display module further comprises the power module, the first reference voltage signal output terminal of the power module comprises a first sub-reference voltage signal output terminal, a second sub-reference voltage signal output terminal, and a third sub-reference voltage signal output terminal, the first sub-reference voltage signal output terminal is electrically connected to the first sub-primary line, the second sub-reference voltage signal output terminal is electrically connected to the second sub-primary line, and the third sub-reference voltage signal output terminal is electrically connected to the third sub-primary line.

16. The display module according to claim 12, wherein the display panel comprises a display area and a non-display area, the display area comprises M partitions, one of the partitions comprises at least one subpixel, and the subpixel comprises the pixel circuit and the light-emitting element, where M is an integer greater than 1;

the display module comprises M first reference voltage signal lines, one of the first reference voltage signal lines corresponds to one of the partitions, and the one of the first reference voltage signal lines is electrically connected to the pixel circuit in the corresponding partition;

voltage values of first reference voltage signals received by the M first reference voltage signal lines are the same or different; and the display module further comprises a power module, the power module comprises at least M first reference voltage signal output terminals, and the M first reference voltage signal output terminals are electrically connected to the M first reference voltage signal lines in one-to-one correspondence.

17. The display module according to claim 12, wherein the display panel comprises a display area and a non-display area, and a plurality of subpixels arranged in an array are located in the display area, the subpixel comprising the pixel circuit and the light-emitting element;

when target brightness of the display panel is less than or equal to a first preset brightness threshold, the first reference voltage signal line transmits a first reference voltage signal;

when the target brightness of the display panel is less than or equal to the first preset brightness threshold, the target control signal line transmits an enable level;

when the target brightness of the display panel is greater than the first preset brightness threshold, the target control signal line transmits a disable level;

target brightness of the display panel being less than or equal to the first preset brightness threshold comprises at least one of:

a brightness level of the display panel being less than or equal to a first brightness level threshold, an average value of grayscales of a plurality of subpixels in a display image frame on the display panel being less than or equal to a second grayscale threshold, a number of the subpixels, whose grayscales are less than or equal to a first grayscale threshold, in the display image frame on the display panel being greater than a first number threshold, or a number of the subpixels, whose grayscales are greater than the first grayscale threshold, in the display image frame on the display panel being less than or equal to a second number threshold;

when the target brightness of the display panel is first target brightness, the first reference voltage signal line transmits the first reference voltage signal with a first target voltage value; when the target brightness of the display panel is second target brightness, the first reference voltage signal line transmits the first reference voltage signal with a second target voltage value; the first target brightness and the second target brightness are both less than or equal to the first preset brightness threshold, the first target brightness is different from the second target brightness, and the first target voltage value is different from the second target voltage value; and the first target brightness is less than the second target brightness, and the first target voltage value is less than the second target voltage value.

18. The display module according to claim 12, wherein when a target brightness of the display panel is greater than a first preset brightness threshold, the first reference voltage signal line does not transmit the first reference voltage signal, and the shunt switch module is turned off under the control of the target control signal line;

the target brightness of the display panel comprises average brightness of a plurality of subpixels in the display panel; and the target brightness of the display panel being greater than the first preset brightness threshold comprises at least one of:

a brightness level of the display panel being greater than a first brightness level threshold, the average value of grayscales of the plurality of subpixels in a display image frame on the display panel being greater than a second grayscale threshold, the number of the subpixels, whose grayscales are less than or equal to a first grayscale threshold, in the display image frame on the display panel being less than or equal to a first number threshold, or the number of the subpixels, whose grayscales are greater than the first grayscale threshold, in the display image frame on the display panel being greater than a second number threshold.

* * * * *